M. C. ROSE.
WHEEL.
APPLICATION FILED OCT. 28, 1911.

1,035,912.

Patented Aug. 20, 1912.

2 SHEETS—SHEET 1.

Witnesses

Max C. Rose
Inventor by C. A. Snow & Co.
Attorneys

M. C. ROSE.
WHEEL.
APPLICATION FILED OCT. 28, 1911.
1,035,912.
Patented Aug. 20, 1912.
2 SHEETS—SHEET 2.
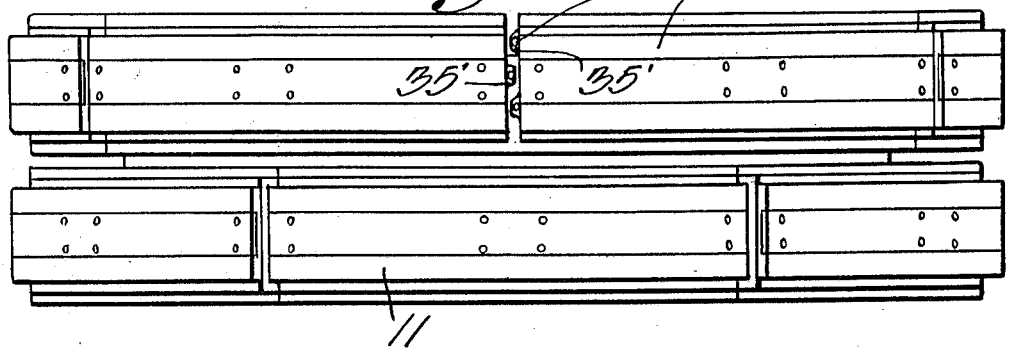
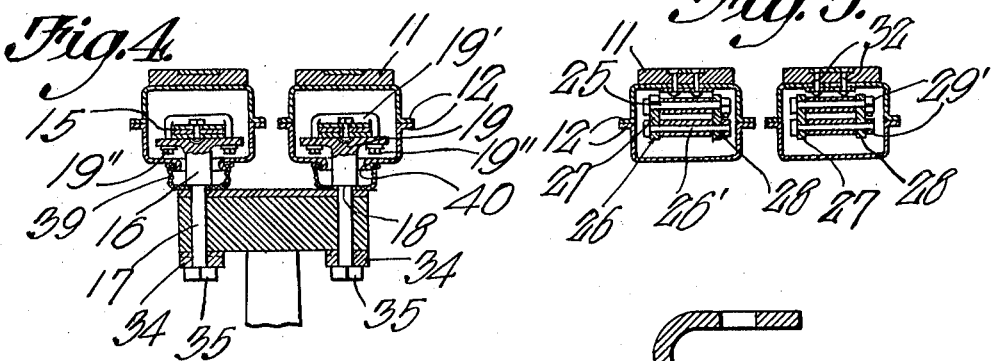
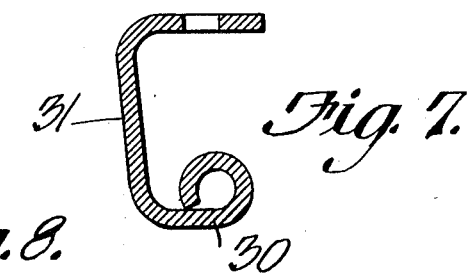
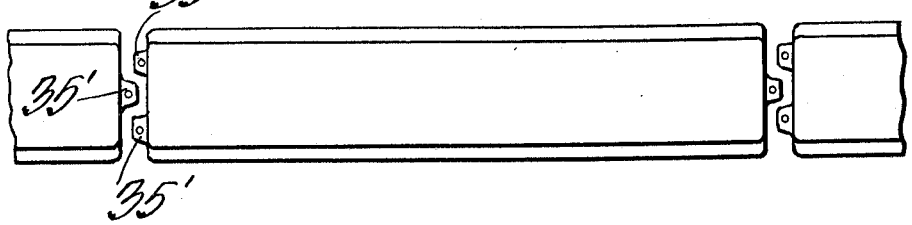
Witnesses
Max C. Rose
Inventor
by C. A. Snow & Co.
Attorneys

UNITED STATES PATENT OFFICE.

MAX C. ROSE, OF CLEVELAND, OHIO.

WHEEL.

1,035,912.  Specification of Letters Patent.  Patented Aug. 20, 1912.

Application filed October 28, 1911. Serial No. 657,218.

*To all whom it may concern:*

Be it known that I, MAX C. ROSE, a citizen of the United States, residing at Cleveland, in the county of Cuyahoga and State of Ohio, have invented a new and useful Wheel, of which the following is a specification.

This invention relates to an improvement in resilient wheels.

The primary object of this invention is to provide a wheel with a tire formed in sections, arranged to house resilient means for spacing the same from the wheel rim.

A further object of the invention is to form a tire of a plurality of sections each of which consists of inner and outer members, any of the sections being capable of removal without disturbing the adjacent sections.

Figure 1:
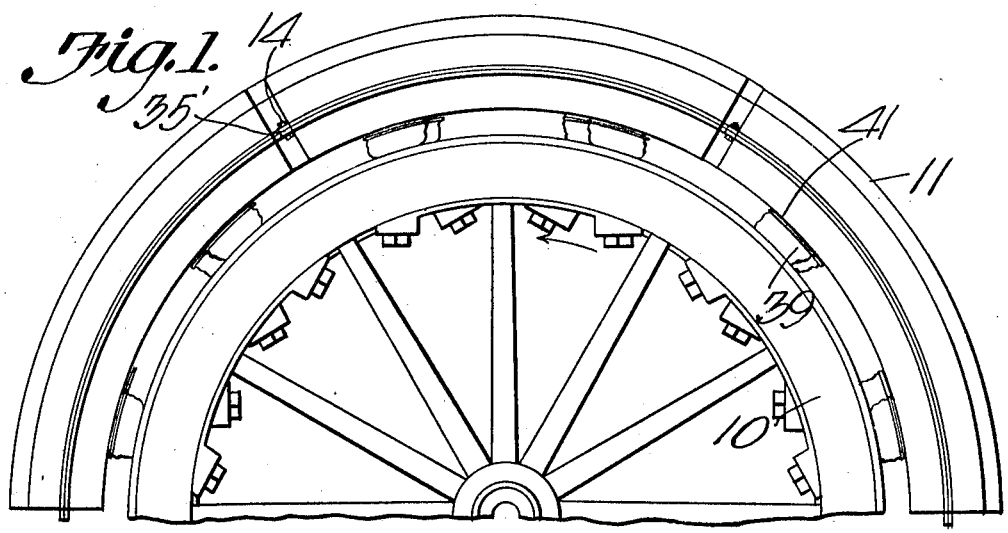
Figure 2:
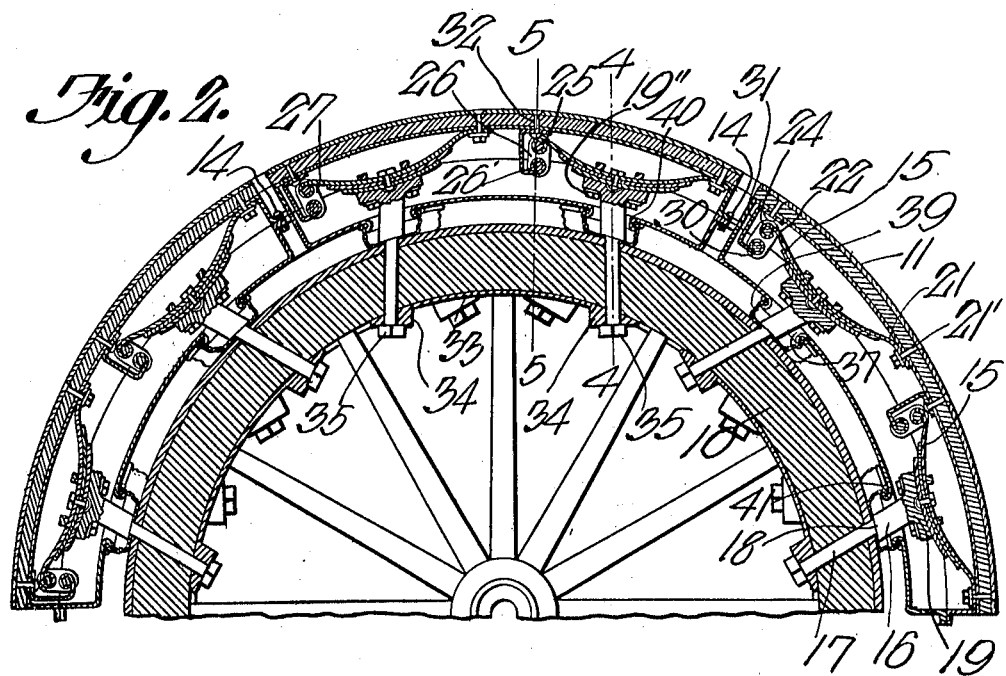

In the drawings: Figure 1 is a side elevation of a portion of the wheel. Fig. 2 is a sectional view. Fig. 3 is a plan view. Fig. 4 is a transverse section on the line 4—4 of Fig. 2. Fig. 5 is a transverse section on the line 5—5 of Fig. 2. Fig. 6 is a detail view of one of the spring securing devices. Fig. 7 is a detail view of one of the spring hangers. Fig. 8 is a plan view, showing the arrangement of the ears of adjacent sections, and Fig. 9 is a perspective view of the strap which receives the end portions of the spring supporting standards.

In the drawings 10 designates the wheel rim, and while the device is applicable to single and double wheels the same is shown applied to a double wheel which is designed for use on truck and heavy vehicles. The tire is composed of a plurality of sections each of which consist of inner and outer members, the outer members which are of substantially the same construction as the inner members being curved to conform to the curvature of the rim, are provided with a tread 11 which may be of any suitable material, said tread being bolted or otherwise secured to the members, and both members are formed with flanges 12, these flanges being secured together by bolts 14. When the inner and outer members are secured together the same form a rectangular housing which is curved to conform to the curvature of the wheel rim. The sections are of a number which is determined by the diameter of the wheel, said sections being so spaced that they may move independently.

The sections are each designed to house a pair of semi-elliptical springs 15, the end portions of which are secured to the outer member. Each of these springs is supported by a standard 16 the reduced portion 17 of which extends through the rim, the shoulder 18 formed by reducing this standard contacting with the rim, the shoulder being disposed obliquely of the standard, to conform to the curvature of said rim. The standards are formed with heads 19 disposed at the same angle as the shoulders, which are secured centrally to the springs by means of the U-shaped straps 19'. The end portions 21 of the springs are secured to the outer members by means of a bolt 21'. The other ends 22 of the springs are formed with loops 24 which embrace the upper rods 25 of links 26. These links consist of the rods 25 and 26' which are connected by the side plates 27 and 28, being held against displacement by the clamps 29' shown in detail in Fig. 6, the lower bar 26' of the link being embraced by the curved terminal 30 of the depending hanger 31 which is secured to the outer member by means of rivets 32. As before stated each section is designed to house a pair of springs. The standards which support each pair of springs are disposed parallel, extending entirely through the wheel rim. Secured to the under face of said rim to correspond with each pair of standards is a strap 33 shown in detail in Fig. 9. This strap is curved to conform to the curvature of the rim and is provided with bosses 34 which are apertured to receive the end portions of the standards. The standards extend through the bosses, the portions of the same which extend beyond the bosses being screw-threaded to receive nuts 35. By this arrangement it will be noted that any of the tire sections may be removed without disturbing or removing the adjacent sections, the nuts 35 being removed and the section lifted out of place. As before stated the sections are so spaced that the same may move independently. At the same time the spacing of said sections is such that a continuous tread surface is presented. The members are provided with ears 35' through which securing devices extend. These ears are disposed at the ends of the members and in order to allow the members to be properly spaced one end of each member is provided with a single ear (see Fig. 8) and the other with a plurality of ears. Thus when the sections are arranged upon the rim the centrally disposed ear of one section will register with the space between the ears of the adjacent section, thus allowing free movement of the sections.

It will be noted from the foregoing that the sections are resiliently spaced from the rim, the springs being housed by the sections. The openings 37 in the inner members through which the standards extend are considerably larger than the standards and in order to prevent dirt or foreign matter from entering the housing the standard is inclosed by the flexible tubular member 39, said member being formed with an opening through which the standard extends, the shoulder formed on the standard clamping the member securely to the rim. The open end of the tubular member embraces the flange 40, the annular member 41, holding the tubular member against displacement. Thus the sections are free to move with respect to the rim and standards, the constructions being such that dust or foreign material cannot get within the housing allowing for a free unobstructed movement of the spring.

Particular attention is called to the arrangement of the springs. As before stated these springs are supported by the standard, the U-shaped bars 19′ embracing the springs, the offset ends of said bars extending through the head of the standard, nuts 19″ being arranged upon said offset ends, the springs thus being rigidly clamped to the standards. One end of the spring is bolted to the outer member while the other is connected to the same by the link 26 which is supported by the depending hanger 31. This link is disposed toward what may be termed the front of the wheel, the same taking up the impact or jar incidental to the traction friction, the wheel turning in the direction indicated by the arrow, Fig. 1. Attention is called to the fact that the entire structure is such as may be easily and economically manufactured, the various parts being readily assembled.

What is claimed is:—

1. A resilient wheel comprising a rim, a tire formed of independently movable sections, each of said sections being formed of inner and outer members secured to each other and movable as one member, standards supported by the rim, said standards being arranged in pairs, the standards of each pair being parallel, a semi-elliptical spring supported by each standard and disposed between the inner and outer tire members, said springs being connected to the outer tire members.

2. A resilient wheel consisting of a rim, a tire composed of sections each of which is formed of inner and outer members, standards arranged in pairs, the standards of each pair being arranged parallel, said standards extending through said rim, the portions of said standards which pass through the rim being reduced, the shoulder thus formed contacting with the rim, said shoulder being disposed obliquely of the standards to conform to the curvature of the rim, a semi-elliptical spring supported by each standard within the sections, said springs having their end portions connected to the outer tire members.

In testimony that I claim the foregoing as my own, I have hereto affixed my signature in the presence of two witnesses.

MAX C. ROSE.

Witnesses:
 E. R. JONES,
 WALLACE J. HILL.

---

Copies of this patent may be obtained for five cents each, by addressing the "Commissioner of Patents, Washington, D. C."